United States Patent
Mochizuki et al.

(10) Patent No.: US 9,961,346 B2
(45) Date of Patent: May 1, 2018

(54) VIDEO ENCODER AND METHOD OF OPERATING THE SAME

(71) Applicant: Renesas Electronics Corporation, Kawasaki-shi, Kanagawa (JP)

(72) Inventors: Seiji Mochizuki, Kanagawa (JP); Tetsuya Shibayama, Kanagawa (JP)

(73) Assignee: Renesas Electronics Corporation, Tokyo (*) Notice: Subject to any disclaimer, the term of this patent is extended or adjusted under 35 U.S.C. 154(b) by 589 days.

(21) Appl. No.: 14/505,369

(22) Filed: Oct. 2, 2014

(65) Prior Publication Data

US 2015/0092840 A1  Apr. 2, 2015

(30) Foreign Application Priority Data

Oct. 2, 2013 (JP) .................................. 2013-207144

(51) Int. Cl.
  *H04N 19/126* (2014.01)
  *H04N 19/593* (2014.01)
  (Continued)

(52) U.S. Cl.
  CPC ......... *H04N 19/126* (2014.11); *H04N 19/115* (2014.11); *H04N 19/124* (2014.11);
  (Continued)

(58) Field of Classification Search
  None
  See application file for complete search history.

(56) References Cited

U.S. PATENT DOCUMENTS 5,587,735 A * 12/1996 Ishida ..................... H04N 5/45
                                                    348/14.04
7,688,234 B2    3/2010 Koo
                (Continued)

FOREIGN PATENT DOCUMENTS

JP    2007-158430 A    6/2007
JP    2009-038746 A    2/2009
              (Continued)

OTHER PUBLICATIONS

T.Sikora, Digital Consumer Electronics Handbook, chapter MPEG-1 and MPEG-2 Digital Coding Standards, McGraw-Hill, 1997.

(Continued)

*Primary Examiner* — Christopher S Kelley
*Assistant Examiner* — Kaitlin A Retallick
(74) *Attorney, Agent, or Firm* — Shapiro, Gabor and Rosenberger, PLLC

(57) ABSTRACT

The present invention provides a video encoder and a method of operating the video encoder to implement high-precision bit rate control by reducing the risk of overflow of an intermediate buffer coupled between a quantizer and an encoding section. The intermediate buffer supplies a selection control signal indicative of whether the amount of stored data is large or small to a selector. If the selection control signal indicates large, the selector outputs an estimated code amount from a code amount estimation section to the rate controller. If the selection control signal indicates small, the selector outputs an actual code amount from the encoding section to the rate controller. The rate controller calculates the quantization scale according to the output of the selector and feedbacks the calculated quantization scale to the quantizer. The quantizer adjusts the quantizer scale.

19 Claims, 5 Drawing Sheets

(51) Int. Cl.
    *H04N 19/176*     (2014.01)
    *H04N 19/149*     (2014.01)
    *H04N 19/115*     (2014.01)
    *H04N 19/124*     (2014.01)
    *H04N 19/146*     (2014.01)
    *H04N 19/152*     (2014.01)
    *H04N 19/50*     (2014.01)

(52) U.S. Cl.
    CPC ......... *H04N 19/146* (2014.11); *H04N 19/149* (2014.11); *H04N 19/152* (2014.11); *H04N 19/176* (2014.11); *H04N 19/593* (2014.11); *H04N 19/50* (2014.11)

(56) References Cited

U.S. PATENT DOCUMENTS

| | | | | |
|---|---|---|---|---|
| 2007/0147500 | A1* | 6/2007 | Chono | H04N 19/172 375/240.12 |
| 2008/0253460 | A1* | 10/2008 | Lin | H03M 7/40 375/240.23 |
| 2009/0058691 | A1* | 3/2009 | Koo | H03M 7/40 341/51 |
| 2009/0225865 | A1* | 9/2009 | Tojima | H03M 7/4006 375/240.25 |

FOREIGN PATENT DOCUMENTS

| | | |
|---|---|---|
| JP | 2009-055384 A | 3/2009 |
| JP | 2011-61320 A | 3/2011 |

OTHER PUBLICATIONS

Hangai, Seiichiro et al., "Complete Understanding of JPEG and MPEG," pp. 144-153, Koronasha, Jul. 30, 2006, First Edition, Second Issue.

Office Action dated May 23, 2017, in Japanese Patent Application No. 2013-207144.

* cited by examiner

VIDEO ENCODER AND METHOD OF OPERATING THE SAME

CROSS-REFERENCE TO RELATED APPLICATIONS

The disclosure of Japanese Patent Application No. 2013-207144 filed on Oct. 2, 2013 including the specification, drawings, and abstract is incorporated herein by reference in its entirety.

BACKGROUND

The present invention relates to a video encoder and a method of operating the same. More particularly, the present invention relates to a technology effective for implementing high-precision bit rate control.

A common moving picture compression method compliant with MPEG-2, which is standardized by the ISO/IEC 13818-2 international standard, is based on a principle in which a video storage capacity and a required bandwidth are reduced by deleting redundant information from a video stream. MPEG is an acronym for Moving Picture Experts Group.

The MPEG-2 standard merely defines the syntax (rules on a compression-encoded data stream or a method of configuring an encoded data bit stream) and decoding process of a bit stream. Therefore, the MPEG-2 standard is flexible enough to be fully usable in various services such as satellite broadcast, cable television, interactive television, and the Internet.

In an MPEG-2 coding process, a video signal is subjected to a sampling process and then to a quantization process in order to initially define the color and luminance components of each pixel of digital video. Values indicative of the color and luminance components are stored in a structure known as a macroblock. The values indicative of the color and luminance components, which are stored in the macroblock, are converted to frequency values by discrete cosine transform (DCT). Frequency conversion coefficients of the luminance and color of a picture, which are derived from DCT, are different in frequency. A quantized DCT coefficient is encoded by a variable-length coding (VLC) method that further compresses a video stream.

For the MPEG-2 coding process, additional compression provided by a motion compression technology is defined. According to the MPEG-2 standard, three different pictures or frames, namely, an I-frame, a P-frame, and a B-frame, exist. The I-frame is an intra-coded frame that is reproduced without referencing any other picture or frame in a video stream. The P-frame and the B-frame are inter-coded frames that are reproduced by referencing another picture or frame. For example, the P-frame and the B-frame each include a motion vector that indicates an estimated motion of a referenced frame. The use of the motion vector enables an MPEG encoder to reduce the bandwidth required for a specific video stream. The I-frame, the P-frame, and the B-frame are called an intra-coded frame, a predictive-coded frame, and a bidirectionally predictive-coded frame, respectively.

Consequently, an MPEG-2 compliant video encoder includes an encoder memory, a motion vector detector, a motion compensator, a subtractor, a DCT section, a quantizer, an inverse quantizer, an inverse DCT section, a frame memory, a variable-length coding section, and an adder. Video input signals are stored in the encoder memory for B-frame encoding and motion vector detection purposes, and then read from the frame memory in the order of encoding. In the subtractor, motion-compensated prediction signals generated by the motion compensator are subtracted from the read video input signals. As regards a predictive residual, which is the result of subtraction, the DCT section and the quantizer perform a DCT process and a quantization process, respectively. A quantized DCT coefficient is not only subjected to a variable-length coding process in the variable-length coding section, but also subjected to a local decoding process in the inverse quantizer and in the inverse DCT section. The result of the local decoding process is supplied to the adder through the frame memory and the motion compensator.

Meanwhile, an MPEG-2 compliant video decoder includes a buffer memory, a variable-length decoding section, an inverse quantizer, an inverse DCT section, a motion compensator, an adder, and a frame memory. An MPEG-2 compliant encoded bit stream is stored in the buffer memory, and then subjected to a variable-length decoding process, an inverse quantization process, and an inverse DCT process, which are performed by the variable-length decoding section, the inverse quantizer, and the inverse DCT section, respectively. As a result, a predictive residual is generated. The adder adds the predictive residual to a reference image that is read from the frame memory in accordance with the motion vector generated during the variable-length coding process. A reproduced image signal is then generated from the output of the adder. The reproduced image signal is stored in the frame memory and used as a reference image for predicting another frame.

According to "Digital Consumer Electronics Handbook, Chapter on MPEG-1 and MPEG-2 Digital Coding Standards, McGraw-Hill, 1997", which is written by T. Sikora, the quantization step size of a quantizer of an encoder is adjusted to achieve a code amount (bit rate) for avoiding the overflow and underflow of a buffer memory of a decoder when the encoder generates a bit stream that is to be supplied to the decoder's buffer memory. For the purpose of making such an adjustment, as described in "Complete Understanding of JPEG and MPEG, pp. 144-153, Koronasha, Jul. 30, 2006, First Edition, Second Issue", which is written by Seiichiro Hangai and Kenji Sugiyama, a virtual video buffer (VB) is supposed to be disposed between a buffer for storing the output of a variable-length coding section of the encoder and the input of the decoder's buffer memory so that the virtual video buffer (VB) exercises feedback control over a quantization control section for adjusting the quantization step size of the encoder's quantizer. In other words, "Complete Understanding of JPEG and MPEG, pp. 144-153, Koronasha, Jul. 30, 2006, First Edition, Second Issue" describes bit rate control of a quantization scale in a quantizer for MPEG coding control called "Test Model 5" that is exercised to provide feedback control of the quantization scale of the encoder's quantizer in accordance with the fill rate of a virtual buffer, which is the ratio of an actual code amount to a target code amount.

A video encoder for performing an entropy coding (variable-length coding) process based on context-adaptive binary arithmetic coding (CABAC) that is compliant with MPEG-4 AVC (H. 264), which is standardized by the ISO/IEC 14496-10 international standard, is shown in FIG. 1 of Japanese Unexamined Patent Application Publication No. 2009-055384. The video encoder includes a predictive coding section, an arithmetic coding section, and a buffer. After the predictive coding section encodes a video input signal by using a predicted value, the arithmetic coding section generates encoded data by subjecting each syntax element to CABAC and stores the encoded data in the buffer. The predictive coding section includes a subtractor, an orthogonal transform section, a quantizer, an inverse quantizer, an inverse orthogonal transform section, a frame memory, and a motion compensator. The arithmetic coding section includes a binarizer, a binarizer buffer, a context calculator, and a binary arithmetic coding section. The quantizer of the predictive coding section is coupled to a rate control section for controlling the quantization scale of the quantizer. Information about the buffer occupancy of the buffer and information about the buffer occupancy of the binarizer buffer are supplied to the rate control section. The binarizer of the arithmetic coding section binarizes multi-valued syntax elements to generate a variable-length binarized symbol sequence. The binarizer cumulatively adds the amounts of binary data in the binarized symbol sequence in the unit of a macroblock. A code amount prediction section is coupled to the binarizer of the arithmetic coding section so that a cumulative addition result produced by the binarizer is supplied to the code amount prediction section. The code amount prediction section calculates a predicted value of the bit amount of encoded data in the buffer from the cumulative total of the amounts of binary data by using a predetermined prediction function and supplies the predicted value to the quantizer of the predictive coding section for the purpose of controlling the quantization scale of the quantizer. In a related-art video encoder that performs an encoding process on a video input signal in real time, a huge amount of computation is required for a process performed by the arithmetic coding section. Therefore, the configuration of the arithmetic coding section is complicated to increase a circuit scale and power consumption. Japanese Unexamined Patent Application Publication No. 2009-055384 states that the use of a prediction function makes it possible to simplify the configuration and decrease the circuit scale and power consumption.

FIG. 1 of Japanese Unexamined Patent Application Publication No. 2007-158430 illustrates a video encoder that performs a variable-length coding process based on context-adaptive binary arithmetic coding (CABAC). In order to provide highly responsive rate control, video data that is not subjected to arithmetic coding is supplied to a code amount estimation section. The estimated code amount generated from the code amount estimation section is supplied to a rate control determination section for the purpose of controlling the quantization step of a quantizer. Japanese Unexamined Patent Application Publication No. 2007-158430 states that, for example, the video data not subjected to arithmetic coding may be a residual signal from a prediction processing section, a DCT coefficient from a DCT section, a quantized coefficient from the quantizer, or binary data from a CABAC section.

Japanese Unexamined Patent Application Publication No. 2009-038746 describes a technology that is based on context-adaptive binary arithmetic coding (CABAC) and used to provide rate control in accordance with an estimated code amount in such a manner as to minimize the error between the estimated code amount and an actual code amount for the purpose of preventing the failure of rate control that is caused by delay in encoding amount acquisition. As such being the case, a video encoder shown in FIG. 10 of Japanese Unexamined Patent Application Publication No. 2009-038746 includes a video compression section, a CABAC section, a code amount estimation section, an estimated code amount substitution section, and a rate control determination section. An input video signal is supplied to the video compression section, which includes a quantizer. An output signal from the video compression section is supplied to the CABAC section, which includes a binarizer and an arithmetic coding section. An output signal from the binarizer of the CABAC section is supplied to an input terminal of the code amount estimation section. Estimated code amounts from the code amount estimation section are cumulatively added by a cumulative estimated code amount calculator in the estimated code amount substitution section. Actual code amounts, which are bit amounts of an encoded stream that is variable-length encoded by the arithmetic coding section of the CABAC section, are cumulatively added by a cumulative code amount calculator in the estimated code amount substitution section. In the estimated code amount substitution section, a cumulative estimated code amount of the cumulative estimated code amount calculator is substituted by a cumulative actual code amount of the cumulative code amount calculator. An output signal from the estimated code amount substitution section is supplied to the rate control determination section. An output signal from the rate control determination section controls the quantization step of the quantizer in the video compression section.

SUMMARY

Before the disclosure of the present invention, the inventors have been engaged in the development of a video encoder that is capable of generating an encoded bit stream by encoding a video input signal in compliance with H.265 (ISO/IEC 23008-2), which is a new standard developed as a successor to the H.264/MPEG-4 AVC standard. Besides, the video encoder is requested to encode a video input signal in compliance with not only the new H.265 standard but also the currently applied H.264/MPEG-4 AVC standard.

The new standard is called informally HEVC (High Efficiency Video Coding) and excellent in compression efficiency due, for instance, to block size optimization. Its compression performance is about four times higher than that of MPEG-2 and about two times higher than that of H.264/AVC. Due to an image size increase, for instance, in digital high-definition television (HDTV) broadcast receivers and digital video cameras capable of recording HDTV signals, it is required that video encoders and video decoders deliver increased processing performance. It is expected that the HEVC standard will meet the above requirements.

Meanwhile, in recent years, 4K TV displays are receiving attention as they have a pixel size of 4096×2160 or 3840× 2160, which is about four times the pixel size (1920×1080) of high definition (HD) TV displays. In Japan, for example, the Ministry of Internal Affairs and Communications has announced its policy of starting 4K TV broadcasts in July 2014. As described above, it is required that the video encoders and video decoders, which encode or decode a video signal of one frame (picture) corresponding to a display screen of a 4K TV display, also deliver high processing performance.

Meanwhile, the HEVC standard also uses the context-adaptive binary arithmetic coding (CABAC) method for variable-length coding (entropy coding), as is the case with the H.264/MPEG-4 AVC standard. However, the use of the context-adaptive binary arithmetic coding (CABAC) method delays the acquisition of the amount of encoding involved in a CABAC process. Therefore, even if rate control is exercised in accordance with an estimated code amount as described in Japanese Unexamined Patent Application Publication No. 2009-038746, a discrepancy arises between an actual code amount and an estimated code amount. Meanwhile, when the inventors of the present invention studied, before the disclosure of the present invention, the use of the context-adaptive binary arithmetic coding (CABAC) method for variable-length coding (entropy coding) by a video encoder, the inventors encountered a problem in which a process performed by a quantizer and a process performed by a CABAC section, which acted as a variable-length coding processor, differed in processing speed.

In other words, the processing performance of the quantizer is defined in terms of its quantization speed. It depends on whether frequency conversion coefficients for several pixels or for several macroblocks can be quantized per cycle.

On the other hand, the coding processor based on the context-adaptive binary arithmetic coding (CABAC) method includes a binarizer, a binary arithmetic coding section, and a context calculator. The binarizer generates a binary signal from a multivalued input signal. The binary arithmetic coding section encodes the binary signal into an encoded bit stream. The context calculator dynamically calculates and updates an event probability model for the binary signal, which is an encoding target symbol, in accordance with the condition of a neighboring symbol. In accordance with the event probability model calculated and updated by the context calculator, the binary arithmetic coding section encodes the binary signal into an encoded bit stream. As a result, the encoding process performed by the CABAC section is a sequential output process that is performed in the unit of one bit to output one bit of an encoded bit stream per cycle. As a variable-length coding process is performed, the number of encoded bits per pixel or macroblock is not fixed. Therefore, the processing time required per pixel or macroblock for the CABAC section greatly varies.

As a result, a plurality of pixels or macroblocks processed by the quantizer during a fixed period of time may not be processed by the CABAC section during the same fixed period of time. Hence, in order to absorb the difference between the processing speed of the quantizer and the processing speed of the CABAC section, it is necessary to couple an intermediate buffer memory between the quantizer and the CABAC section. As a result, in a video encoder that uses a CABAC section, an asynchronous operation method, an intermediate buffer memory, the timing at which an actual code amount is acquired at the output of the CABAC section is significantly delayed from the timing at which an estimated code amount is acquired by the quantizer at the input of the CABAC section. Therefore, if the quantization scale of the quantizer is controlled in response to only the actual code amount at the output of the CABAC section, the deviation of an actual bit rate controlled during the delay time from a target bit rate may increase. If, on the other hand, the quantization scale of the quantizer is controlled in response to only the estimated code amount derived from the input of the CABAC section, the delay in control is reduced; however, control based on the estimated code amount causes greater error than control based on the actual code amount. Hence, the studies conducted by the inventors of the present invention before the disclosure of the present invention have revealed a problem in which high-precision bit rate control cannot be implemented no matter whether control based on an actual code amount or control based on an estimated code amount is exercised.

Meanwhile, in order to encode a video input signal in compliance with the current H.264/MPEG-4 AVC standard, it is necessary to adopt not only the context-adaptive binary arithmetic coding (CABAC) method but also the context-adaptive variable-length coding (CAVLC) method for variable-length coding (entropy coding) purposes. As is well known, the context-adaptive variable-length coding (CAVLC) method is used only for encoding a quantized DCT coefficient value. This method performs a zigzag scan to convert a quantized DCT coefficient value to a one-dimensional vector and then encodes information required for decoding. The information required for decoding includes a nonzero coefficient value (level), the number of nonzero coefficients (TotalCoeff), the number of zeros before a nonzero coefficient (run_before), the number of zeros before the last nonzero coefficient (total_zeros), the number of trailing successive coefficients having an absolute value of 1 (TrailingOnes), and the signs of such coefficients (Trailing_one_sign_flag). The context-adaptive variable-length coding (CAVLC) method permits the use of a configuration in which the processing time per coefficient is fixed. Therefore, the upper-limit processing time per pixel or macroblock can be fixed. The timing at which an actual code amount is acquired at the output of a CAVLC section is not delayed by more than the upper-limit processing time from the timing at which an estimated code amount is acquired at the input of the CAVLC section. However, let us assume a case where a power-saving architecture is employed to reduce the power consumption of the video encoder so that the operation clock of the CAVLC section is lower in frequency than the operation clock of the quantizer. In this case, in order to absorb the difference in processing performance between the quantizer and the CAVLC section, it is necessary to couple an intermediate buffer memory between the quantizer and the CAVLC section and allow the quantizer and the CAVLC section to operate asynchronously. As a result, in a video encoder that uses a CAVLC section, an asynchronous operation method, an intermediate buffer memory, the timing at which an actual code amount is acquired at the output of the CAVLC section is significantly delayed from the timing at which an estimated code amount is acquired by the quantizer at the input of the CAVLC section. Therefore, if the quantization scale of the quantizer is controlled in response to only the actual code amount at the output of the CAVLC section, the deviation of an actual bit rate controlled during the delay time from a target bit rate may increase. If, on the other hand, the quantization scale of the quantizer is controlled in response to only the estimated code amount derived from the input of the CAVLC section, the delay in control is reduced; however, control based on the estimated code amount causes greater error than control based on the actual code amount. Hence, the studies conducted by the inventors of the present invention before the disclosure of the present invention have revealed a problem in which high-precision bit rate control cannot be implemented no matter whether control based on an actual code amount or control based on an estimated code amount is exercised.

Means for solving the above problem will be described below. Other problems and novel features will become apparent from the following description and from the accompanying drawings.

The following is a brief description of a representative aspect of the present invention disclosed in this document.

In a video encoder (1) according to a representative aspect of the present invention, an intermediate buffer (200) is coupled between the output terminal of a quantizer (103) and the input terminal of an encoding section (201).

The input terminal of a code amount estimation section (300) is coupled to the output terminal of the quantizer (103). An estimated code amount generated from the output terminal of the code amount estimation section (300) is supplied to a first input terminal of a code amount selector (301). An actual code amount of a compressed video bit stream (CVBS) encoded by the encoding section (201) is supplied to a second input terminal of the code amount selector (301).

A determination signal indicative of whether the amount of data stored in the intermediate buffer (200) is large or small is supplied to a selection control terminal of the code amount selector (301). The output terminal of the code amount selector (301) is coupled to the input terminal of a rate controller (302). An output signal of the rate controller (302) adjusts the quantization scale of the quantizer (103).

If the determination signal indicates that the amount of data stored in the intermediate buffer (200) is large, the estimated code amount from the code amount estimation section (300), which is supplied to the first input terminal of the code amount selector (301), is output to the output terminal of the code amount selector (301). The estimated code amount then adjusts the quantization scale of the quantizer (103).

If the determination signal indicates that the amount of data stored in the intermediate buffer (200) is small, the actual code amount from the encoding section (201), which is supplied to the second input terminal of the code amount selector (301), is output to the output terminal of the code amount selector (301). The actual code amount then adjusts the quantization scale of the quantizer (103) (see FIG. 1).

The following is a brief description of an advantageous effect achievable by the representative aspect of the present invention disclosed in this document.

The video encoder (1) is capable of implementing high-precision bit rate control.

BRIEF DESCRIPTION OF THE DRAWINGS

Embodiments of the present invention will be described in detail based on the following figures, in which.

DETAILED DESCRIPTION

1. Summary of the Embodiments

Figure 1:
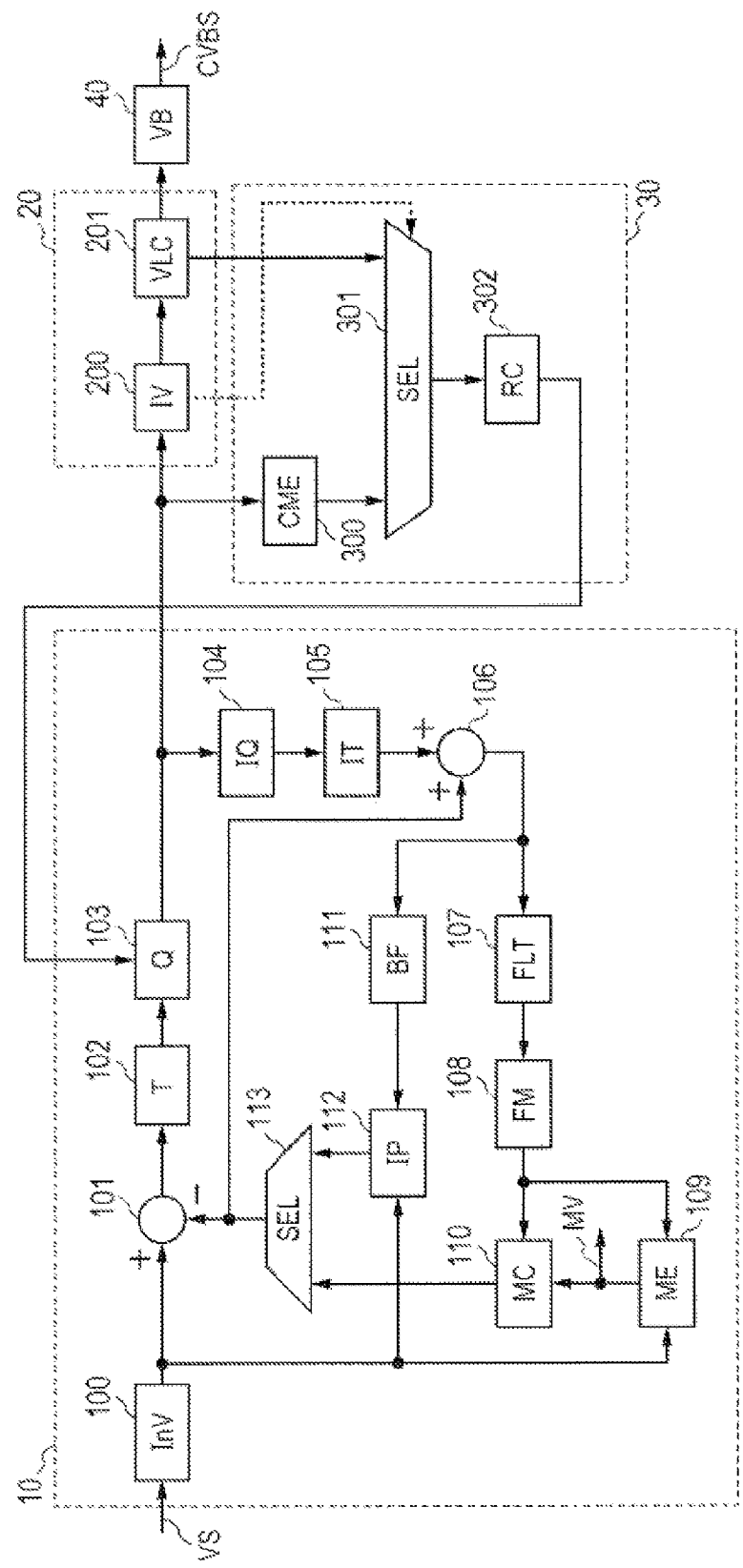
FIG. 1 is a diagram illustrating the configuration of a video encoder according to a first embodiment of the present invention.

First of all, representative embodiments of the present invention disclosed in this document will be summarized. The parenthesized reference numerals in the accompanying drawings referred to in the summary of the representative embodiments merely illustrate what is contained in the concept of elements to which the reference numerals are affixed.

[1] According to a representative embodiment, there is provided a video encoder (1) including a frequency converter (102), a quantizer (103), an encoding section (201), an intermediate buffer (200), a code amount estimation section (300), a code amount selector (301), and a rate controller (302).

The frequency converter (102) performs a frequency conversion process on an input signal.

The quantizer (103) performs a quantization process on the result of the frequency conversion process performed by the frequency converter (102).

The encoding section (201) generates a compressed video bit stream (CVBS) by performing an encoding process on the result of the quantization process performed by the quantizer (103).

The intermediate buffer (200) is coupled between the output terminal of the quantizer (103) and the input terminal of the encoding section (201).

The input terminal of the code amount estimation section (300) is coupled to the output terminal of the quantizer (103). An estimated code amount generated from the output terminal of the code amount estimation section (300) is supplied to the first input terminal of the code amount selector (301).

An actual code amount of the compressed video bit stream (CVBS) encoded by the encoding section (201) is supplied to the second input terminal of the code amount selector (301).

A determination signal indicative of whether the amount of data stored in the intermediate buffer (200) is large or small is supplied to a selection control terminal of the code amount selector (301).

The output terminal of the code amount selector (301) is coupled to the input terminal of the rate controller (302). An output signal of the rate controller (302) adjusts the quantization scale of the quantizer (103).

If the determination signal indicates that the amount of data stored in the intermediate buffer (200) is large, the estimated code amount from the code amount estimation section (300), which is supplied to the first input terminal of the code amount selector (301), is output to the output terminal of the code amount selector (301). The estimated code amount then adjusts the quantization scale of the quantizer (103).

If the determination signal indicates that the amount of data stored in the intermediate buffer (200) is small, the actual code amount from the encoding section (201), which is supplied to the second input terminal of the code amount selector (301), is output to the output terminal of the code amount selector (301). The actual code amount then adjusts the quantization scale of the quantizer (103) (see FIG. 1).

When the process of the encoding section is significantly delayed, the above-described embodiment uses the estimated code amount. When, on the other hand, the process of the encoding section is insignificantly delayed, the above-described embodiment uses the actual code amount. This makes it possible to implement high-precision bit rate control.

In a preferred embodiment, the encoding section (201) performs an encoding process by using at least either the arithmetic coding (CABAC) method or the variable-length coding (CAVLC) method (see FIG. 1).

In another preferred embodiment, when the encoding section (201) performs an encoding process by using the arithmetic coding (CABAC) method, the intermediate buffer (200) absorbs the processing speed difference between the quantization process of the quantizer (103) and the encoding process of the encoding section (201), which is based on the arithmetic coding (CABAC) method.

When the encoding section (201) performs an encoding process by using the variable-length coding (CAVLC) method, the intermediate buffer (200) absorbs the processing speed difference between the quantization process of the quantizer (103) and the encoding process of the encoding section (201), which is based on the variable-length coding (CAVLC) method (see FIG. 1).

In still another preferred embodiment, whether the amount of data stored in the intermediate buffer (200) is large or small is determined by checking whether the amount of stored data is larger than a predetermined threshold or by checking whether the amount of stored data is smaller than the predetermined threshold (see FIG. 1).

In a more preferred embodiment, the encoding section (201) includes an exponential-Golomb coding section (2011), a variable-length coding processor (2012), and an arithmetic coding processor (2013).

The exponential-Golomb coding section (2011) generates an exponential-Golomb code by encoding a syntax element to be encoded. The exponential-Golomb code includes a prefix, a separator, and a suffix.

The variable-length coding processor (2012) performs a zigzag scan to convert the result of the frequency conversion process performed by the frequency converter (102), which is quantized by the quantizer (103), into a one-dimensional vector, and then performs the encoding process based on the variable-length coding (CAVLC) method.

The arithmetic coding processor (2013) includes a binarizer (20131), a binary arithmetic coding section (20132), and a context calculator (20133).

The binarizer (20131) generates a binary signal from a multivalued input signal. The generated binary signal is encoded into an encoded bit stream by the binary arithmetic coding section (20132).

The context calculator (20133) dynamically calculates and updates an event probability model for the binary signal, which is an encoding target symbol, in accordance with the condition of a neighboring symbol. In accordance with the event probability model calculated and updated by the context calculator (20133), the binary arithmetic coding section (20132) encodes the binary signal into an encoded bit stream (see FIG. 2).

Figure 3:
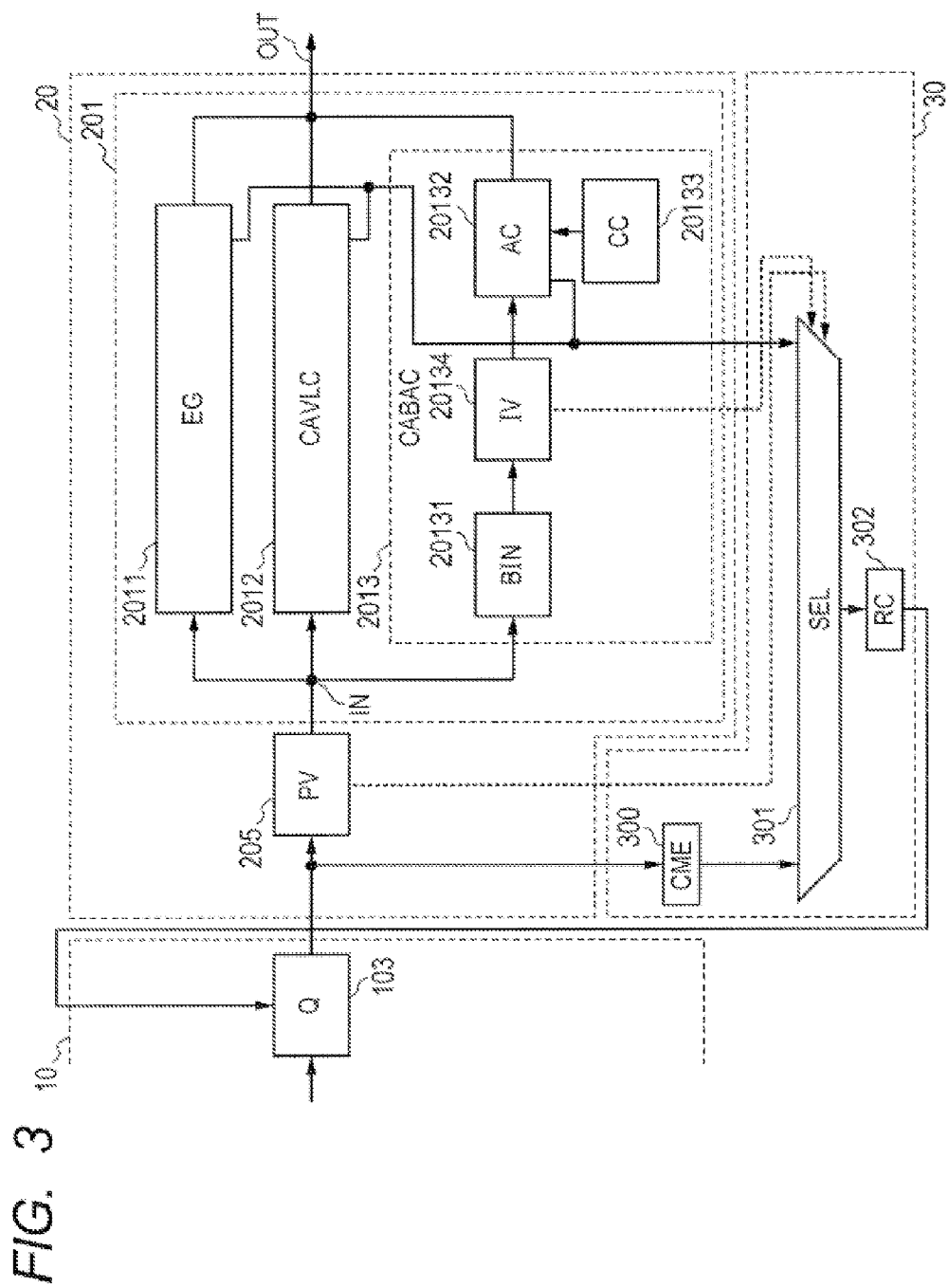
FIG. 3 is a diagram illustrating the configuration of essential parts of the video encoder according to a second embodiment of the present invention.

In another more preferred embodiment, the intermediate buffer (20134) is disposed in the arithmetic coding processor (2013) and coupled between the binarizer (20131) and the binary arithmetic coding section (20132) (see FIG. 3).

In yet another more preferred embodiment, an actual code amount of the binary arithmetic coding section (20132) in the arithmetic coding processor (2013) is supplied to the second input terminal of the code amount selector (301) (see FIG. 3).

The video encoder (1) according to still another more preferred embodiment further includes a first counter (114), a second counter (304), and a selector controller (303).

The first counter (114) retains a first count value by counting the number of an image block, which is a coding process unit and quantized by the quantizer (103).

The second counter (304) retains a second count value by counting the number of an image block, which is a coding process unit and encoded by the encoding section (201).

The selector controller (303) determines the difference between the first count value of the first counter (114) and the second count value of the second counter (304).

If the difference between the first count value of the first counter (114) and the second count value of the second counter (304) is great, the selector controller (303) determines that a process performed by the encoding section (201) is delayed or that the amount of data stored in the intermediate buffer (200) is large.

If the difference between the first count value of the first counter (114) and the second count value of the second counter (304) is great, the selector controller (303) determines that a delay of a process performed by the encoding section (201) or that the amount of data stored in the intermediate buffer (200) is large.

Figure 4:
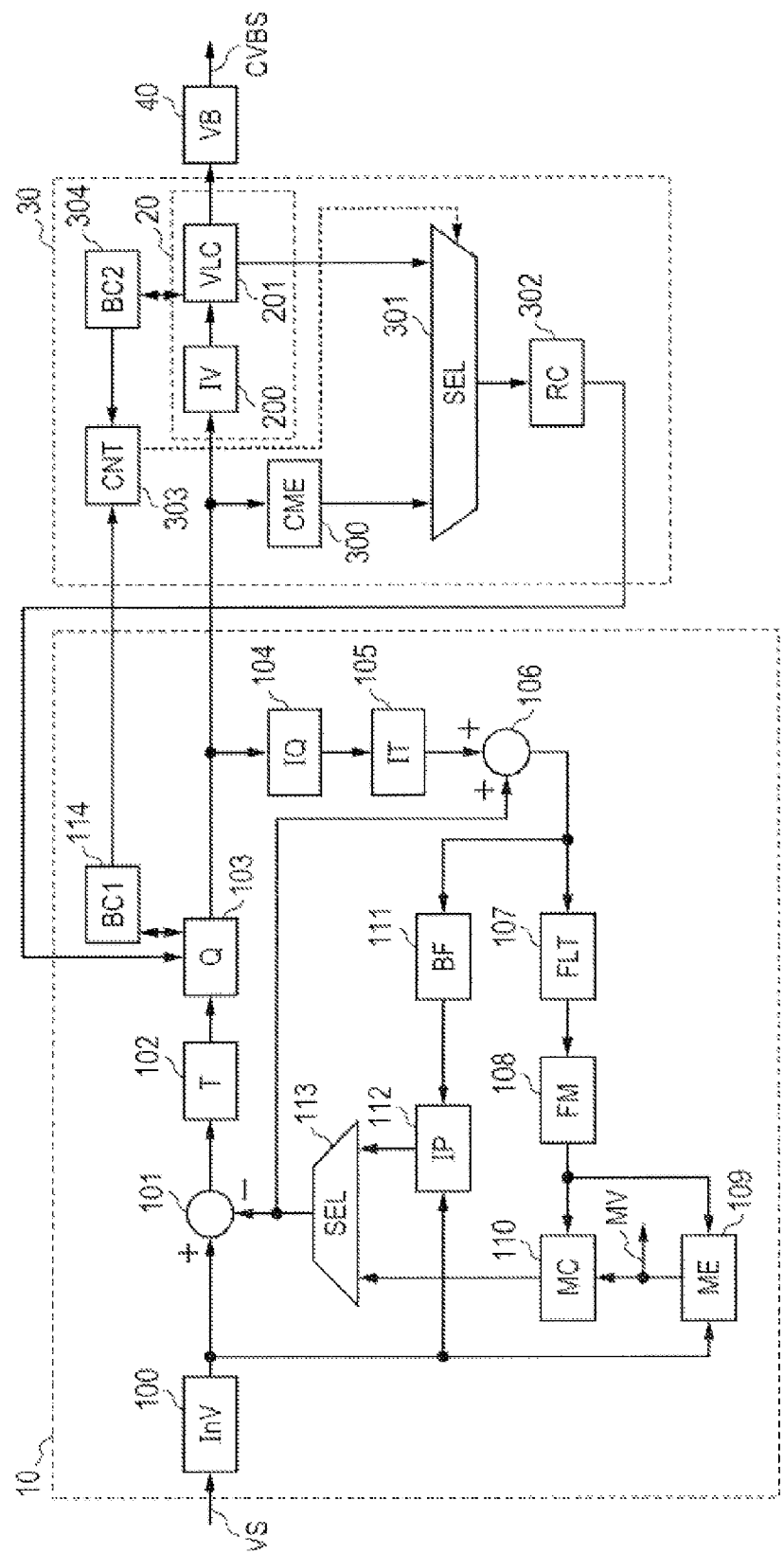
FIG. 4 is a diagram illustrating the configuration of essential parts of the video encoder according to a third embodiment of the present invention.

If the difference between the first count value of the first counter (114) and the second count value of the second counter (304) is small, the selector controller (303) determines that a delay of a process performed by the encoding section (201) or that the amount of data stored in the intermediate buffer (200) is small (see FIG. 4).

In an additional more preferred embodiment, the image block that is a coding process unit and quantized by the quantizer (103) and the image block that is a coding process unit and encoded by the encoding section (201) are a macroblock having a pixel size of 16×16 in terms of a luminance component.

In a specific embodiment, the image block that is a coding process unit and quantized by the quantizer (103) and the image block that is a coding process unit and encoded by the encoding section (201) are a coding unit (CU) having a flexible block structure.

The coding unit (CU) is adaptively divisible from a largest coding unit (LCU) having a pixel size of 64×64.

The video encoder (1) according to another specific embodiment further includes a motion vector detector (109), a motion compensator (110), a subtractor (101), an inverse quantizer (104), an inverse frequency converter (105), memories (108, 111), an intra-prediction section (112), and a prediction selector (113).

The motion vector detector (109) generates a motion vector (MV) from a video signal (VS) to be encoded and from a reference image stored in the memory (108).

The motion compensator (110) generates a motion-compensated prediction signal in response to the motion vector (MV) generated from the motion vector detector (109) and to the reference signal stored in the memory (108).

The video signal (VS) is supplied to one input terminal of the subtractor (101). The motion-compensated prediction signal generated from the motion compensator (110) is supplied to the other input terminal of the subtractor (101). A predictive residual is generated from the output terminal of the subtractor (101).

The predictive residual generated from the output terminal of the subtractor (101) is supplied to the input terminal of the frequency converter (102) as the input signal for the frequency conversion process.

The inverse quantizer (104) and the inverse frequency converter (105) perform a local decoding process on the result of the quantization process performed by the quantizer (103). The result of the local decoding process is stored in the memory (108) as the reference image.

The result of the local decoding process performed by the inverse quantizer (104) and the inverse frequency converter (105) is stored in the memory (111) as an intra-reference image.

The video signal (VS) is supplied to one input terminal of the intra-prediction section (112). The intra-reference image stored in the memory (111) is supplied to the other input terminal of the intra-prediction section (112). Hence, the intra-prediction section (112) generates an intra-prediction signal about the video signal (VS) supplied to the one input terminal.

The prediction selector (113) selects either the motion-compensated prediction signal generated from the motion compensator (110) or the intra-prediction signal generated from the intra-prediction section (112) and supplies the selected prediction signal to the other input terminal of the subtractor (101) (see FIGS. 1 and 4).

In a more specific embodiment, the frequency converter (102), the quantizer (103), the encoding section (201), the intermediate buffer (200), the code amount estimation section (300), the code amount selector (301), and the rate controller (302) are integrated into a single semiconductor chip in a semiconductor integrated circuit.

In another more specific embodiment, the motion vector detector, the motion compensator, the subtractor, the inverse quantizer, the inverse frequency converter, the encoding section, the intra-prediction section, and the prediction selector are further integrated into the single semiconductor chip in the semiconductor integrated circuit.

The video encoder (1) according to the most specific embodiment generates the compressed video bit stream (CVBS) by encoding the video signal (VS) in compliance with the H.264 or H.265 standard, whichever is arbitrarily selected.

[2] According to another representative embodiment, there is provided a method of operating a video encoder (1) including a frequency converter (102), a quantizer (103), an encoding section (201), an intermediate buffer (200), a code amount estimation section (300), a code amount selector (301), and a rate controller (302).

The frequency converter (102) performs a frequency conversion process on an input signal.

The quantizer (103) performs a quantization process on the result of the frequency conversion process performed by the frequency converter (102).

The encoding section (201) generates a compressed video bit stream (CVBS) by performing an encoding process on the result of the quantization process performed by the quantizer (103).

The intermediate buffer (200) is coupled between the output terminal of the quantizer (103) and the input terminal of the encoding section (201).

The input terminal of the code amount estimation section (300) is coupled to the output terminal of the quantizer (103). An estimated code amount generated from the output terminal of the code amount estimation section (300) is supplied to a first input terminal of the code amount selector (301).

An actual code amount of the compressed video bit stream (CVBS) encoded by the encoding section (201) is supplied to a second input terminal of the code amount selector (301).

A determination signal indicative of whether the amount of data stored in the intermediate buffer (200) is large or small is supplied to a selection control terminal of the code amount selector (301).

The output terminal of the code amount selector (301) is coupled to the input terminal of the rate controller (302). An output signal of the rate controller (302) adjusts the quantization scale of the quantizer (103).

If the determination signal indicates that the amount of data stored in the intermediate buffer (200) is large, the estimated code amount from the code amount estimation section (300), which is supplied to the first input terminal of the code amount selector (301), is output to the output terminal of the code amount selector (301). The estimated code amount then adjusts the quantization scale of the quantizer (103).

If the determination signal indicates that the amount of data stored in the intermediate buffer (200) is small, the actual code amount from the encoding section (201), which is supplied to the second input terminal of the code amount selector (301), is output to the output terminal of the code amount selector (301). The actual code amount then adjusts the quantization scale of the quantizer (103) (see FIG. 1).

When the process of the encoding section is significantly delayed, the above-described embodiment uses the estimated code amount. When, on the other hand, the process of the encoding section is insignificantly delayed, the above-described embodiment uses the actual code amount. This makes it possible to implement high-precision bit rate control.

2. Details of the Embodiments

Embodiments of the present invention will now be described in further detail. Throughout the drawings for illustrating the best embodiments for implementing the present invention, parts having the same functions are designated by the same reference numerals and will not be redundantly described.

First Embodiment

<<Configuration of Video Encoder According to First Embodiment>>

FIG. 1 is a diagram illustrating the configuration of a video encoder 1 according to a first embodiment of the present invention. The video encoder 1 according to the first embodiment encodes a video input signal VS in compliance with the current H.264/MPEG-4 AVC standard or the new H.265 standard, whichever is arbitrarily selected.

The video encoder 1 according to the first embodiment, which is shown in FIG. 1, includes a predictive coding section 10, a coding processor 20, a rate control section 30, and a video buffer 40.

The predictive coding section 10 includes a video input buffer 100, a subtractor 101, a frequency converter 102, a quantizer 103, an inverse quantizer 104, an inverse frequency converter 105, an adder 106, a filter unit 107, a frame memory 108, a motion vector detector 109, a motion compensator 110, a buffer memory 111, an intra-prediction section 112, and a selector 113.

The coding processor 20 includes an intermediate buffer memory 200 and a variable-length coding section 201.

The rate control section 30 includes a code amount estimation section 300, a selector 301, and a rate controller 302.

<<Overview of Video Encoder>>

The video encoder 1 according to the first embodiment, which is shown in FIG. 1, will now be summarized. Whether the amount of data stored in the intermediate buffer memory 200 is large or small is determined. In response to the result of determination, a selection operation of the selector 301 is set. An estimated code amount of the code amount estimation section 300 is supplied to a first input terminal of the selector 301. An actual code amount of the variable-length coding section 201 is supplied to a second input terminal of the selector 301. Hence, the rate controller 302 calculates the quantization scale of the quantizer 103 in response to a selection output signal of the selector 301.

More specifically, if the amount of data stored in the intermediate buffer memory 200 is determined to be large, the estimated code amount of the code amount estimation section 300, which is supplied to the first input terminal of the selector 301, is selected. If, on the other hand, the amount of data stored in the intermediate buffer memory 200 is determined to be small, the actual code amount of the variable-length coding section 201, which is supplied to the second input terminal of the selector 301, is selected.

Hence, if the amount of data stored in the intermediate buffer memory 200 is large, the quantization scale calculated by the rate controller 302 in accordance with the estimated code amount of the code amount estimation section 300, which provides high-speed feedback control in contrast to the actual code amount of the variable-length coding section 201, is supplied to the quantizer 103. Consequently, high-precision bit rate control can be implemented as high-speed feedback control is exercised over the quantization scale of the quantizer 103 in accordance with the estimated code amount of the code amount estimation section 300.

On the other hand, if the amount of data stored in the intermediate buffer memory 200 is small, the quantization scale calculated by the rate controller 302 in accordance with the actual code amount of the variable-length coding section 201, which includes delay in contrast to the estimated code amount of the code amount estimation section 300, is supplied to the quantizer 103. Consequently, high-precision bit rate control can be implemented as high-precision feedback control is exercised over the quantization scale of the quantizer 103 in accordance with the actual code amount of the variable-length coding section 201.

<<Details of Video Encoder>>

The video encoder 1 according to the first embodiment, which is shown in FIG. 1, will now be described in detail.

<<Operations of Predictive Coding Section and Coding Processor>>

According to a next-generation standard called HEVC, coding units (CUs), which are flexible block structures, are obtained by adaptively dividing into small blocks using a quadtree for the purpose of achieving excellent performance beginning with the largest coding unit (LCU) having a pixel size of 64×64.

When a video signal VS is encoded in compliance with the HEVC standard, the video signal VS is divided into coding units (CUs), which are coding process units having a flexible block structure compliant with the HEVC standard, and then the coding units (CUs) are stored in the video input buffer 100 of the predictive coding section 10. The coding units (CUs) read from the video input buffer 100 are supplied to one input terminal of the subtractor 101, to one input terminal of the motion vector detector 109, and to one input terminal of the intra-prediction section 112.

Although not shown in FIG. 1, a prediction mode indicative of inter-prediction or intra-prediction of each picture of video is supplied from a coding control unit (not shown) to the selector 113 and to the variable-length coding section 201 of the coding processor 20.

First of all, let us assume a case where the video signal VS is inter-coded. In this case, the coding units (CUs) of the video signal VS to be inter-coded are stored in the video input buffer 100 for B-frame encoding and motion vector detection purposes. The coding units (CUs) are then read from the video input buffer 100 and supplied to one input terminal of the subtractor 101. The motion vector detector 109 generates a motion vector MV in response to the video signal read from the video input buffer 100 and to a reference image stored in the frame memory 108. The motion compensator 110 generates a motion-compensated prediction signal in response to the motion vector MV generated from the motion vector detector 109 and to the reference image stored in the frame memory 108. The motion-compensated prediction signal from the motion compensator 110 is supplied to the subtractor 101 through the selector 113 and subtracted from the video signal in the subtractor 101. The frequency converter 102 and the quantizer 103 respectively perform a frequency conversion process and a quantization process on a predictive residual, which is a subtraction output signal from the subtractor 101. The frequency conversion process in the frequency converter 102 is an integer-based discrete cosine transform (DCT) or discrete sine transform (DST) that outputs a conversion coefficient formed of only an integer without a fractional component. The frequency conversion coefficient quantized by the quantizer 103 and the motion vector MV generated from the motion vector detector 109 are subjected to a variable-length coding process in the variable-length coding section 201 of the coding processor 20. A compressed video bit stream CVBS is then generated through the video buffer 40. The frequency conversion coefficient quantized by the quantizer 103 is subjected to a local decoding process that is performed by the inverse quantizer 104, the inverse frequency converter 105, the adder 106, and the filter unit 107. The result of the local decoding process is then stored in the frame memory 108 as a reference image.

The filter unit 107 functions as a deblocking filter that reduces block distortion in compliance with the MPEG-4 AVC (H.264) standard. In order to comply with the new H.265 (HEVC) standard, the filter unit 107 also exercises a filtering function, called "sample adaptive offset (SAO)", after executing the deblocking filter function. The sample adaptive offset (SAO) filter function properly rebuilds the amplitude of original signal by using a lookup table that describes additional parameters determined by the frequency distribution analysis of the coding control unit (not shown) in the video encoder 1.

Next, let us assume a case where the video signal VS is intra-coded. In this case, the video signal VS to be intra-coded is stored in the video input buffer 100. The video signal VS read from the video input buffer 100 is then supplied to one input terminal of the intra-prediction section 112. Meanwhile, a reference image that is encoded by intra-prediction and generated by the local decoding process is stored in the buffer memory 111, and the reference image read from the buffer memory 111 is supplied to the other input terminal of the intra-prediction section 112. Therefore, when the coding unit (CU) of the video signal supplied to the one input terminal is to be intra-coded, the intra-prediction section 112 selects an optimal coding unit from a plurality of neighboring coding units (CUs) included in the encoded reference image supplied from the buffer memory 111 to the other input terminal, and generates spatial information about the selected optimal coding unit (CU). As a result, the intra-prediction section 112 supplies intra-prediction information to the selector 113. The intra-prediction section 112 includes an intra-predicted optimal coding unit (CU) and an associated spatial prediction mode.

<<Intermediate Buffer Memory in Coding Processor and Rate Control Section>>

The intermediate buffer memory 200 in the coding processor 20 is coupled between the quantizer 103 and the variable-length coding section 201 in order to absorb the difference in processing performance between the quantizer 103 in the predictive coding section 10 and a CABAC section in the variable-length coding section 201 when the variable-length coding section 201 performs an encoding process based on the context-adaptive binary arithmetic coding (CABAC) method. Further, the intermediate buffer memory 200 in the coding processor 20 is used to adopt a power-saving architecture for making the operation clock of a CAVLC processor in the variable-length coding section 201 lower in frequency than the operation clock of the quantizer 103 when the variable-length coding section 201 performs an encoding process based on the context-adaptive variable-length coding (CAVLC) method. In other words, in order to adopt the above-mentioned power-saving architecture, the intermediate buffer memory 200 is coupled between the quantizer 103 and the variable-length coding section 201 for the purpose of absorbing the difference in processing performance between the quantizer 103 in the predictive coding section 10 and the CAVLC processor in the variable-length coding section 201.

As described earlier, the rate control section 30 includes the code amount estimation section 300, the selector 301, and the rate controller 302.

The input terminal of the code amount estimation section 300 is coupled to the output terminal of the quantizer 103 in the predictive coding section 10. Hence, in order to reduce the delay in the control of the quantization scale of the quantizer 103, the code amount estimation section 300 estimates the code amount of a compressed video bit stream CVBS generated from the output terminal of the variable-length coding section 201 in accordance with the frequency conversion coefficient quantized by the quantizer 103 before a CABAC process or CAVLC process of the variable-length coding section 201. The estimated code amount generated from the output terminal of the code amount estimation section 300 is supplied to the first input terminal of the selector 301. The estimated code amount includes an error, but does not include the delay in the CABAC process or CAVLC process of the variable-length coding section 201. The estimated code amount generated from the code amount estimation section 300 is, for example, the code length of data encoded by an exponential-Golomb code that is defined by the MPEG-4 AVC (H.264) standard. As is well known, the exponential-Golomb code includes a prefix (a sequence of "0s"), a separator ("1"), and a suffix (a combination of "0" and "1") and is used for entropy coding (variable-length coding) of a DCT coefficient and a syntax element such as a motion vector.

Meanwhile, the actual code amount of a compressed video bit stream CVBS that is to be encoded by the CABAC process or CAVLC process of the variable-length coding section 201 is supplied to the second input terminal of the selector 301. The actual code amount includes the delay in the CABAC process or CAVLC process of the variable-length coding section 201, but makes it possible to exercise high-precision bit rate control without allowing the value of a code amount to include an error, unlike the estimated code amount.

Further, a selection control signal is supplied from the intermediate buffer memory 200 to a selection control terminal of the selector 301. If the amount of data (quantized frequency conversion coefficient and the like) stored in the intermediate buffer memory 200 is small, the selection control signal generated from the intermediate buffer memory 200 is, for example, at low level "0". Hence, in response to the selection control signal, which is at low level "0", the selector 301 selects the actual code amount of the variable-length coding section 201, which is supplied to the second input terminal of the selector 301, and outputs the selected actual code amount to its output terminal. As a result, the rate controller 302 calculates the quantization scale of the quantizer 103 from the actual code amount of the variable-length coding section 201, which is output to the output terminal of the selector 301. As the quantization scale calculated by the rate controller 302 is supplied to the quantizer 103, the quantization scale of the quantizer 103 is set in response to the actual code amount of the variable-length coding section 201. More specifically, if the amount of data stored in the intermediate buffer memory 200 is small and the selection control signal is at low level "0", the quantization scale calculated by the rate controller 302 in accordance with the actual code amount of the variable-length coding section 201, which includes delay but a small amount of error in contrast to the estimated code amount of the code amount estimation section 300, is supplied to the quantizer 103. Consequently, high-precision bit rate control can be implemented as high-precision feedback control is exercised over the quantization scale of the quantizer 103 in accordance with the actual code amount of the variable-length coding section 201.

If, on the other hand, the amount of data stored in the intermediate buffer memory 200 is large, the selection control signal generated from the intermediate buffer memory 200 is, for example, at high level "1". Therefore, in response to the selection control signal at high level "1", the selector 301 selects the estimated code amount of the code amount estimation section 300, which is supplied to the first input terminal of the selector 301, and outputs the selected estimated code amount to its output terminal. As a result, the rate controller 302 calculates the quantization scale of the quantizer 103 from the estimated code amount of the code amount estimation section 300, which is output to the output terminal of the selector 301. As the quantization scale calculated by the rate controller 302 is supplied to the quantizer 103, the quantization scale of the quantizer 103 is set in response to the estimated code amount of the code amount estimation section 300. More specifically, if the amount of data stored in the intermediate buffer memory 200 is large, the quantization scale calculated by the rate controller 302 in accordance with the estimated code amount of the code amount estimation section 300, which provides high-speed feedback control in contrast to the actual code amount of the variable-length coding section 201, is supplied to the quantizer 103. Consequently, high-precision bit rate control can be implemented as high-speed feedback control is exercised over the quantization scale of the quantizer 103 in accordance with the estimated code amount of the code amount estimation section 300.

<<Determination of Amount of Data Stored in Intermediate Buffer Memory>>

Whether the amount of data stored in the intermediate buffer memory 200 is large or small can be determined by comparing it against a predetermined threshold. If the amount of data stored in the intermediate buffer memory 200 is smaller than the predetermined threshold, the selection control signal generated from the intermediate buffer memory 200 is at low level "0". Hence, the selector 301 selects the actual code amount of the variable-length coding section 201, which is supplied to the second input terminal of the selector 301, and outputs the selected actual code amount to the output terminal. If, on the other hand, the amount of data stored in the intermediate buffer memory 200 is larger than the predetermined threshold, the selection control signal generated from the intermediate buffer memory 200 is at high level "1". Hence, the selector 301 selects the estimated code amount of the code amount estimation section 300, which is supplied to the first input terminal of the selector 301, and outputs the selected estimated code amount to the output terminal.

<<Semiconductor Integrated Circuit of Video Encoder>>

Further, according to the first embodiment, which is shown in FIG. 1, the video encoder having the predictive coding section 10, the coding processor 20, the rate control section 30, and the video buffer 40 is mostly integrated into a semiconductor chip in a semiconductor integrated circuit. The semiconductor integrated circuit is, for example, a large-scale semiconductor integrated circuit that is manufactured by a state-of-the-art semiconductor manufacturing process and called a system LSI or a system-on-chip (SOC).

In the predictive coding section 10, except for the frame memory 108 and the buffer memory 111, the video input buffer 100, the subtractor 101, the frequency converter 102, the quantizer 103, the inverse quantizer 104, the inverse frequency converter 105, the adder 106, the filter unit 107, the motion vector detector 109, the motion compensator 110, the intra-prediction section 112, and the selector 113 are integrated into a semiconductor chip. The frame memory 108 and the buffer memory 111 are integrated into another semiconductor chip that serves as a synchronous dynamic random-access memory (SDRAM).

The intermediate buffer memory 200 and variable-length coding section 201 of the coding processor 20 are integrated into the above-mentioned semiconductor chip. Therefore, the intermediate buffer memory 200 is formed of a static random-access memory (SRAM) built in the semiconductor chip. In an alternative embodiment, the intermediate buffer memory 200 may be formed of the above-mentioned synchronous dynamic random-access memory (SDRAM).

The code amount estimation section 300, selector 301, and rate controller 302 of the rate control section 30 are integrated into the above-mentioned semiconductor chip.

The video buffer 40 for generating a compressed video bit stream CVBS may be formed of the above-mentioned synchronous dynamic random-access memory (SDRAM). In an alternative embodiment, the video buffer 40 may act as the virtual buffer described in "Complete Understanding of JPEG and MPEG, pp. 144-153, Koronasha, Jul. 30, 2006, First Edition, Second Issue". As a result, bit rate control called "Test Model 5" may be exercised to control the fill rate of (the amount of data stored in) the video buffer 40 configured as the virtual buffer, that is, permit the rate control section 30 to provide feedback control of the quantization scale of the quantizer 103.

<<Configuration of Variable-Length Coding Section>>

Figure 2:
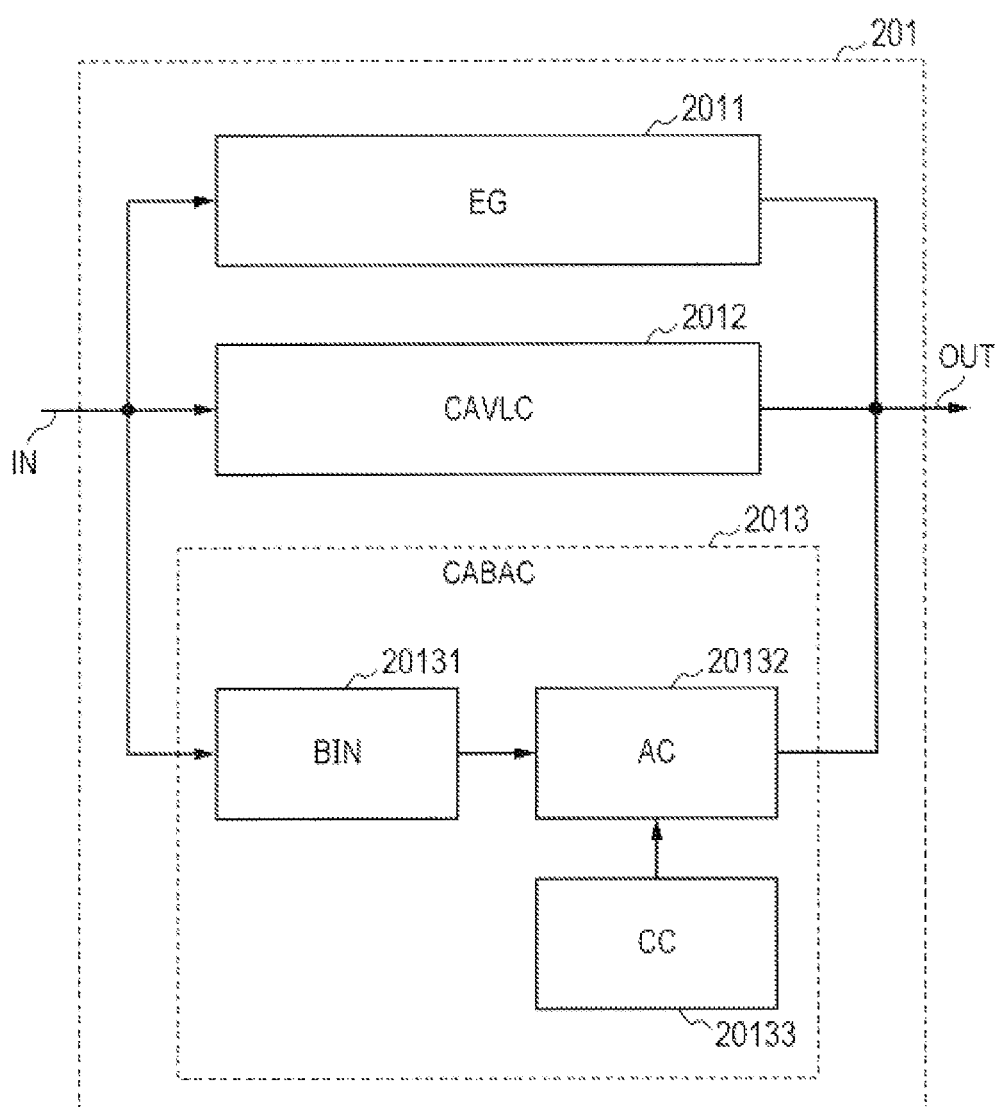
FIG. 2 is a diagram illustrating the configuration of a variable-length coding section included in a coding processor of the video encoder according to the first embodiment, shown in FIG. 1.

FIG. 2 is a diagram illustrating the configuration of the variable-length coding section 201 included in the coding processor 20 of the video encoder 1 according to the first embodiment, which is shown in FIG. 1.

As shown in FIG. 2, the variable-length coding section 201 includes an exponential-Golomb coding section 2011, a CAVLC processor 2012, and a CABAC processor 2013.

The exponential-Golomb coding section 2011 is used for entropy coding (variable-length coding) of a DCT coefficient and a syntax element such as a motion vector, as mentioned earlier. More specifically, the exponential-Golomb coding section 2011 encodes various syntax elements into an exponential-Golomb code that includes a prefix, a separator, and a suffix. Therefore, when a syntax element needs to be encoded into an exponential-Golomb code, the exponential-Golomb coding section 2011 is activated in response to an activation control signal supplied from the coding control unit (not shown). In the other situations, the exponential-Golomb coding section 2011 is deactivated to achieve low power consumption.

The CAVLC processor 2012 converts a DCT coefficient value, which is used only for encoding a quantized DCT coefficient value and quantized as descried earlier, into a one-dimensional vector by performing a zigzag scan, and then performs an encoding process based on the context adaptive variable-length coding (CAVLC) method. In other words, the CALVLC processor 2012 performs a CAVLC process to encode information that is required for decoding a nonzero coefficient value, the number of nonzero coefficients, the number of zeros before a nonzero coefficient, the number of zeros before the last nonzero coefficient, the number of trailing successive coefficients having an absolute value of 1, and the signs of such coefficients. Therefore, when the CAVLC process needs to be performed in the CAVLC processor 2012, the CAVLC processor 2012 is activated in response to an activation control signal supplied from the coding control unit (not shown). In the other situations, the CAVLC processor 2012 is deactivated to achieve low power consumption.

The CABAC processor 2013 includes a binarizer 20131, a binary arithmetic coding section 20132, and a context calculator 20133 as described earlier. The binarizer 20131 generates a binary signal from a multivalued input signal. The generated binary signal is encoded into an encoded bit stream by the binary arithmetic coding section 20132. The context calculator 20133 dynamically calculates and updates an event probability model for the binary signal, which is an encoding target symbol, in accordance with the condition of a neighboring symbol. In accordance with the event probability model calculated and updated by the context calculator 20133, the binary arithmetic coding section 20132 encodes the binary signal into an encoded bit stream. As a result, the encoding process performed by the CABAC processor 2013 is a bit-by-bit sequential output process that outputs one bit of an encoded bit stream per cycle. When the CABAC process needs to be performed by the CABAC processor 2013, the CABAC processor 2013 is activated in response to an activation control signal supplied from the coding control unit (not shown). In the other situations, the CABAC processor 2013 is deactivated to achieve low power consumption.

As shown in FIG. 2, the input terminal of the exponential-Golomb coding section 2011, the input terminal of the CAVLC processor 2012, and the input terminal of the CABAC processor 2013 are coupled to the input terminal IN of the variable-length coding section 201, and the output terminal of the exponential-Golomb coding section 2011, the output terminal of the CAVLC processor 2012, and the output terminal of the CABAC processor 2013 are coupled to the output terminal OUT of the variable-length coding section 201.

<<Advantageous Effect of First Embodiment>>

When the process of the coding processor 20 is significantly delayed and a large amount of data is stored in the intermediate buffer memory 200, the video encoder 1 according to the first embodiment, which is shown in FIGS. 1 and 2, uses the estimated code amount, which makes it possible to provide high-speed feedback control. When, on the other hand, the process of the coding processor 20 is insignificantly delayed and a small amount of data is stored in the intermediate buffer memory 200, the video encoder 1 according to the first embodiment uses the actual code amount, which includes a small amount of error. Consequently, the video encoder 1 can implement high-precision bit rate control.

Second Embodiment
<<Configuration of Essential Parts of Video Encoder According to Second Embodiment>>

FIG. 3 is a diagram illustrating the configuration of essential parts of the video encoder 1 according to a second embodiment of the present invention.

The following describes the difference between the video encoder 1 according to the second embodiment, which is shown in FIG. 3, and the video encoder 1 according to the first embodiment, which is shown FIGS. 1 and 2.

In the video encoder 1 according to the second embodiment, which is shown in FIG. 3, the intermediate buffer memory 200 coupled between the quantizer 102 and the coding processor 20 in the video encoder 1 according to the first embodiment, which is shown in FIGS. 1 and 2, is replaced by a pre-buffer memory 205. The pre-buffer memory 205 may be formed of a static random-access memory (SRAM) built in the semiconductor chip in the aforementioned semiconductor integrated circuit. In an alternative embodiment, the pre-buffer memory 205 may be formed of the aforementioned synchronous dynamic random-access memory (SDRAM).

When either the exponential-Golomb coding section 2011 or the CAVLC processor 2012 is activated in the variable-length coding section 201, whether the amount of data stored in the pre-buffer memory 205 is large or small is determined. In the selector 301 of the rate control section 30, the estimated code amount of the code amount estimation section 300 is supplied to the first input terminal, and the actual code amount at the output section of the exponential-Golomb coding section 2011 or CAVLC processor 2012 is supplied to the second input terminal. The selection operation of the selector 301 is then set in response to the result of determination of the amount of data stored in the pre-buffer memory 205. As described above, the rate controller 302 calculates the quantization scale of the quantizer 103 in response to the selection output signal of the selector 301.

More specifically, if the amount of data stored in the pre-buffer memory 205 is determined to be large, the estimated code amount of the code amount estimation section 300, which is supplied to the first input terminal of the selector 301, is selected. If, on the other hand, the amount of data stored in the pre-buffer memory 205 is determined to be small, the actual code amount at the output section of the exponential-Golomb coding section 2011 or CAVLC processor 2012, which is supplied to the second input terminal of the selector 301, is selected.

Hence, if the amount of data stored in the pre-buffer memory 205 is large, the pre-buffer memory 205 may overflow. However, the quantization scale calculated by the rate controller 302 in accordance with the estimated code amount of the code amount estimation section 300, which provides high-speed feedback control in contrast to the actual code amount at the output section of the exponential-Golomb coding section 2011 or CAVLC processor 2012, is supplied to the quantizer 103. As a result, the quantization scale of the quantizer 103 is subjected to high-speed feedback control based on the estimated code amount of the code amount estimation section 300. This makes it possible to reduce the risk of causing the pre-buffer memory 205 to overflow.

If, on the other hand, the amount of data stored in the pre-buffer memory 205 is small, the pre-buffer memory 205 does not overflow. However, the quantization scale calculated by the rate controller 302 in accordance with the actual code amount at the output section of the exponential-Golomb coding section 2011 or CAVLC processor 2012, which provides high-speed feedback control in contrast to the estimated code amount of the code amount estimation section 300, is supplied to the quantizer 103. As a result, the quantization scale of the quantizer 103 is subjected to high-speed feedback control based on the actual code amount at the output section of the exponential-Golomb coding section 2011 or CAVLC processor 2012. This makes it possible to implement high-precision bit rate control.

If the CABAC processor 2013 is activated in the variable-length coding section 201, whether the amount of data stored in an intermediate buffer memory 20134 coupled between the binarizer 20131 and binary arithmetic coding section 20132 of the CABAC processor 2013 is large or small is determined.

In the selector 301 of the rate control section 30, the estimated code amount of the code amount estimation section 300 is supplied to the first input terminal, and the actual code amount of the binary arithmetic coding section 20132 in the CABAC processor 2013 is supplied to the second input terminal. The selection control operation of the selector 301 is then set in response to the result of determination of the amount of data stored in the intermediate buffer memory 20134. As described above, the rate controller 302 calculates the quantization scale of the quantizer 103 in response to the selection output signal of the selector 301.

More specifically, if the amount of data stored in the intermediate buffer memory 20134 is determined to be large, the estimated code amount of the code amount estimation section 300, which is supplied to the first input terminal of the selector 301, is selected. If, on the other hand, the amount of data stored in the intermediate buffer memory 20134 is determined to be small, the actual code amount of the binary arithmetic coding section 20132 in the CABAC processor 2013, which is supplied to the second input terminal of the selector 301, is selected.

Hence, if the amount of data stored in the intermediate buffer memory 20134 is large, the quantization scale calculated by the rate controller 302 in accordance with the estimated code amount of the code amount estimation section 300, which provides high-speed feedback control in contrast to the actual code amount of the binary arithmetic coding section 20132 in the CABAC processor 2013, is supplied to the quantizer 103. As a result, the quantization scale of the quantizer 103 is subjected to high-speed feedback control based on the estimated code amount of the code amount estimation section 300. This makes it possible to implement high-precision bit rate control.

If, on the other hand, the amount of data stored in the intermediate buffer memory 20134 is small, the quantization scale calculated by the rate controller 302 in accordance with the actual code amount of the binary arithmetic coding section 20132 in the CABAC processor 2013, which includes delay but a small amount of error in contrast to the estimated code amount of the code amount estimation section 300, is supplied to the quantizer 103. Consequently, the quantization scale of the quantizer 103 is subjected to high-precision feedback control based on the actual code amount of the variable-length coding section 201. This makes it possible to implement high-precision bit rate control.

<<Advantageous Effect of Second Embodiment>>

If the process of the binary arithmetic coding section 20132 is significantly delayed and a large amount of data is stored in the intermediate buffer memory 20134 in a situation where the CABAC processor 2013 is activated, the video encoder 1 according to the second embodiment, which is shown in FIG. 3, uses the estimated code amount, which makes it possible to provide high-speed feedback control. If, on the other hand, the process of the binary arithmetic coding section 20132 is insignificantly delayed and a small amount of data is stored in the intermediate buffer memory 20134, the video encoder 1 according to the second embodiment, which is shown in FIG. 3, uses the actual code amount, which includes a small amount of error. Consequently, the video encoder 1 can implement high-precision bit rate control.

Third Embodiment

<<Configuration of Essential Parts of Video Encoder According to Third Embodiment>>

FIG. 4 is a diagram illustrating the configuration of essential parts of the video encoder 1 according to a third embodiment of the present invention.

The following describes the difference between the video encoder 1 according to the third embodiment, which is shown in FIG. 4, and the video encoder 1 according to the first embodiment, which is shown in FIGS. 1 and 2.

In the video encoder 1 according to the first embodiment, which is shown in FIGS. 1 and 2, whether the delay in the process of the coding processor 20 is significant or insignificant is determined by checking whether the amount of data stored in the intermediate buffer memory 200 is small or large. On the other hand, in the video encoder 1 according to the third embodiment, which is shown in FIG. 4, whether the delay in the process of the coding processor 20 is significant or insignificant is determined by checking whether the difference between a first count value and a second count value is small or great. The first count value is counted by a first counter 114, which counts the number of image blocks, which are coding process units and included in the video signal VS. The second count value is counted by a second counter 304, which counts the number of image blocks, which are coding process units and included in the video signal VS. The difference between the first count value of the first counter 114 and the second count value of the second counter 304 is determined by a selector controller 303 that controls the selector 301.

First of all, when the video encoder according to the third embodiment, which is shown in FIG. 4, encodes the video input signal VS in compliance with the current H.264/MPEG-4 AVC standard, the image blocks, which are coding process units, are macroblocks having a pixel size of 16×16 in terms of a luminance component. Therefore, the first counter 114 in the predictive coding section 10 retains the first count value by counting the number of a macroblock that is quantized by the quantizer 103 in the predictive coding section 10. Meanwhile, the second counter 304 in the rate control section 30 retains the second count value by counting the number of a macroblock that is encoded by the variable-length coding section 201 in the coding processor 20.

In the above instance, if the delay in the process of the coding processor 20 is insignificant and the amount of data stored in the intermediate buffer memory 200 is small, the second count value retained by the second counter 304 in the rate control section 30 is slightly smaller than the first count value retained by the first counter 114 in the predictive coding section 10. If, on the other hand, the delay in the process of the coding processor 20 is significant and the amount of data stored in the intermediate buffer memory 200 is large, the second count value retained by the second counter 304 in the rate control section 30 is considerably smaller than the first count value retained by the first counter 114 in the predictive coding section 10. As mentioned earlier, the difference between the first count value of the first counter 114 and the second count value of the second counter 304 can be determined by the selector controller 303 that controls the selector 301. If the selector controller 303 determines that the difference between the two count values is great while the delay in the process of the coding processor 20 is significant and the amount of data stored in the intermediate buffer memory 200 is large, the estimated code amount of the code amount estimation section 300, which is supplied to the first input terminal of the selector 301, is selected. If, on the other hand, the selector controller 303 determines that the difference between the two count values is small while the delay in the process of the coding processor 20 is insignificant and the amount of data stored in the intermediate buffer memory 200 is small, the actual code amount of the variable-length coding section 201, which is supplied to the second input terminal of the selector 301, is selected.

Next, when the video encoder according to the third embodiment, which is shown in FIG. 4, encodes the video input signal VS in compliance with the new H.265 standard, the image blocks, which are coding process units, are coding units (CUs) having a flexible block structure. Therefore, the first counter 114 in the predictive coding section 10 retains the first count value by counting the number of a coding unit (CU) that is quantized by the quantizer 103 in the predictive coding section 10. Meanwhile, the second counter 304 in the rate control section 30 retains the second count value by counting the number of a coding unit (CU) that is encoded by the variable-length coding section 201 in the coding processor 20. The maximum coding unit (CU) is the largest coding unit (LCU) having a pixel size of 64×64. In some cases, therefore, the first counter 114 and the second counter 304 count the number of the largest coding unit (LCU).

In the above instance, too, if the delay in the process of the coding processor 20 is insignificant and the amount of data stored in the intermediate buffer memory 200 is small, the second count value retained by the second counter 304 in the rate control section 30 is slightly smaller than the first count value retained by the first counter 114 in the predictive coding section 10. If, on the other hand, the delay in the process of the coding processor 20 is significant and the amount of data stored in the intermediate buffer memory 200 is large, the second count value retained by the second counter 304 in the rate control section 30 is considerably smaller than the first count value retained by the first counter 114 in the predictive coding section 10. As mentioned earlier, the difference between the first count value of the first counter 114 and the second count value of the second counter 304 can be determined by the selector controller 303 that controls the selector 301. If the selector controller 303 determines that the difference between the two count values is great while the delay in the process of the coding processor 20 is significant and the amount of data stored in the intermediate buffer memory 200 is large, the estimated code amount of the code amount estimation section 300, which is supplied to the first input terminal of the selector 301, is selected. If, on the other hand, the selector controller 303 determines that the difference between the two count values is small while the delay in the process of the coding processor 20 is insignificant and the amount of data stored in the intermediate buffer memory 200 is small, the actual code amount of the variable-length coding section 201, which is supplied to the second input terminal of the selector 301, is selected.

While the embodiments of the present invention contemplated by the inventors have been described in detail, the present invention is not limited to the specific embodiments described above. It is to be understood that many variations and modifications of the present invention may be made without departing from the spirit and scope of the present invention.

For example, the video encoder 1 according to the second embodiment, which is shown in FIG. 3, is also capable of using the first counter 114, the second counter 204, and the selector controller 303, as is the case with the video encoder 1 according to the third embodiment, which is shown in FIG. 4, in order to determine whether the delay in the process of the coding processor 20 is significant or insignificant or whether the amount of data stored in the intermediate buffer memory 200 is large or small.

Figure 5:
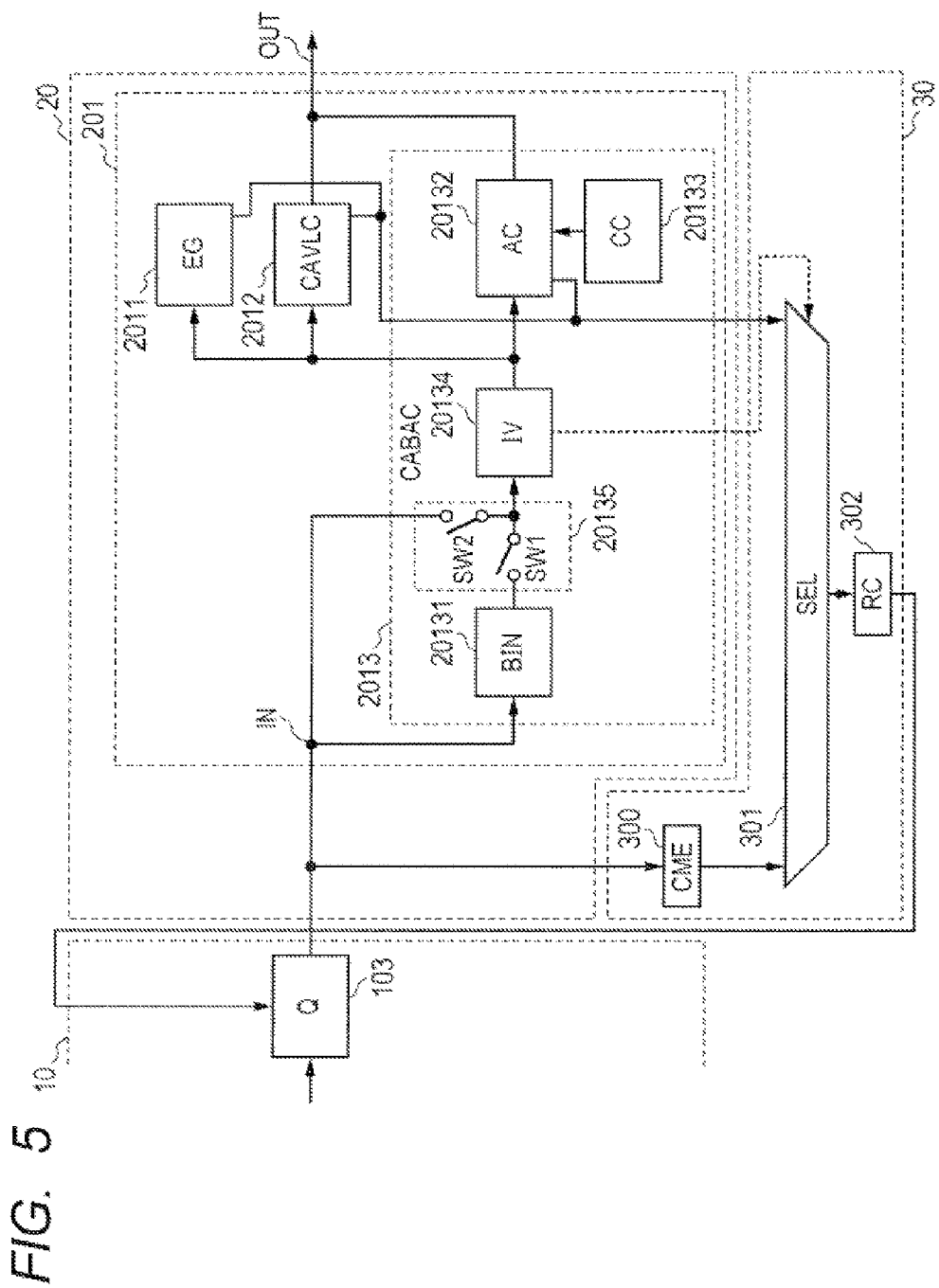
FIG. 5 is a diagram illustrating the configuration of the video encoder according to an alternative embodiment without a pre-buffer memory that is coupled between a quantizer and the variable-length coding section, which are included in the video encoder according to the second embodiment shown in FIG. 3.

FIG. 5 is a diagram illustrating the configuration of the video encoder 1 according to an alternative embodiment without the pre-buffer memory 205 that is coupled between the quantizer 103 and the variable-length coding section 201, which are included in the video encoder 1 according to the second embodiment shown in FIG. 3.

In the video encoder 1 shown in FIG. 5, a selector switch 20135 having a switch SW1 and a switch SW2 is coupled between the binarizer 20131 and intermediate buffer memory 20134 in the CABAC processor 2013.

When the binarizer 20131, binary arithmetic coding section 20132, and context calculator 20133 of the CABAC processor 2013 perform a CABAC process in the video encoder 1 shown in FIG. 5, the selector switch 20135 is controlled so that the switch SW1 is turned on with the switch SW2 turned off. As a result, the binarizer 20131 generates a binary signal from a multivalued input signal. The generated binary signal is then supplied to the binary arithmetic coding section 20132 through the switch SW1 and the intermediate buffer memory 20134. Therefore, the binary signal is encoded into an encoded bit stream by the binary arithmetic coding section 20132.

When the exponential-Golomb coding section 2011 or the CAVLC processor 2012 is activated in the video encoder 1 shown in FIG. 5, the selector switch 20135 is controlled so that the switch SW1 is turned off with the switch SW2 turned on. As a result, the frequency conversion coefficient quantized by the quantizer 103, which is at the input terminal IN of the variable-length coding section 201, is supplied to the input terminal of the exponential-Golomb coding section 2011 and to the input terminal of the CAVLC processor 2012 through the switch SW2 and the intermediate buffer memory 20134 and not through the binarizer 20131 and the switch SW1.

Even in the video encoder 1 shown in FIG. 5, if the amount of data stored in the intermediate buffer memory 20134 is large, the quantization scale calculated by the rate controller 302 in accordance with the estimated code amount of the code amount estimation section 300, which provides high-speed feedback control in contrast to the actual code amount of the binary arithmetic coding section 20132 in the CABAC processor 2013, is supplied to the quantizer 103. As a result, the quantization scale of the quantizer 103 is subjected to high-speed feedback control based on the estimated code amount of the code amount estimation section 300. This makes it possible to implement high-precision bit rate control.

If, on the other hand, the amount of data stored in the intermediate buffer memory 20134 is small, the quantization scale calculated by the rate controller 302 in accordance with the actual code amount of the binary arithmetic coding section 20132 in the CABAC processor 2013, which includes delay but a small amount of error in contrast to the estimated code amount of the code amount estimation section 300, is supplied to the quantizer 103. Consequently, the quantization scale of the quantizer 103 is subjected to high-precision feedback control based on the actual code amount of the variable-length coding section 201. This makes it possible to implement high-precision bit rate control.

The present invention is not only applicable to a process of encoding the video input signal VS in compliance with the new H.265 standard, but also applicable to an encoding process compliant with a future standard that handles the largest coding unit (LCU), which is larger than a pixel size of 64×64, as a process unit.

What is claimed is:

1. A video encoder comprising:
   a frequency converter;
   a quantizer;
   an encoding section;
   an intermediate buffer;
   a code amount estimation section;
   a code amount selector; and
   a rate controller,
   wherein the frequency converter performs a frequency conversion process on an input signal,
   wherein the quantizer performs a quantization process on the result of the frequency conversion process performed by the frequency converter,
   wherein the encoding section generates a compressed video bit stream by performing an encoding process on the result of the quantization process performed by the quantizer,
   wherein the intermediate buffer is coupled between the output terminal of the quantizer and the input terminal of the encoding section,
   wherein the input terminal of the code amount estimation section is coupled to the output terminal of the quantizer,
   wherein an estimated code amount generated from the output terminal of the code amount estimation section is supplied to the first input terminal of the code amount selector,
   wherein an actual code amount of the compressed video bit stream encoded by the encoding section is supplied to the second input terminal of the code amount selector,
   wherein a determination signal indicative of whether the amount of data stored in the intermediate buffer is large or small is supplied to a selection control terminal of the code amount selector,
   wherein the output terminal of the code amount selector is coupled to the input terminal of the rate controller to provide a selected code amount in accordance with the determination signal, the selected code amount being the estimated code amount or the actual code amount,
   wherein an output signal of the rate controller is used to adjust a quantization scale of the quantizer, the quantization scale of the quantizer being calculated based on the selected code amount,
   wherein, if the determination signal indicates that the amount of data stored in the intermediate buffer is large, the estimated code amount from the code amount estimation section, which is supplied to the first input terminal of the code amount selector, is output to the output terminal of the code amount selector, and the estimated code amount is used to adjust the quantization scale of the quantizer,
   wherein, if the determination signal indicates that the amount of data stored in the intermediate buffer is small, the actual code amount from the encoding section, which is supplied to the second input terminal of the code amount selector, is output to the output terminal of the code amount selector, and the actual code amount is used to adjust the quantization scale of the quantizer, wherein the determination signal is supplied to a selection control terminal of the code amount selector to determine whether a delay in a process of the encoding section is significant or insignificant, the delay being significant in the case where the amount or data stored in the intermediate buffer is large and insignificant in the case where the amount of data stored in the intermediate buffer is small, and wherein the estimated code amount is used to adjust the quantization scale of the quantizer without the delay in the process of the encoding section.

2. The video encoder according to claim 1, wherein the encoding section performs an encoding process by using at least either one of an arithmetic coding method and a variable-length coding method.

3. The video encoder according to claim 2, wherein, when the encoding section performs an encoding process by using the arithmetic coding method, the intermediate buffer absorbs the processing speed difference between the quantization process of the quantizer and the encoding process of the encoding section, which is based on the arithmetic coding method, and wherein, when the encoding section performs an encoding process by using the variable-length coding method, the intermediate buffer absorbs the processing speed difference between the quantization process of the quantizer and the encoding process of the encoding section, which is based on the variable-length coding method.

4. The video encoder according to claim 2, wherein the encoding section includes an exponential-Golomb coding section, a variable-length coding processor, and an arithmetic coding processor, wherein the exponential-Golomb coding section generates an exponential-Golomb code by encoding a syntax element to be encoded, the exponential-Golomb code including a prefix, a separator, and a suffix, wherein the variable-length coding processor performs a zigzag scan to convert the result of the frequency conversion process performed by the frequency converter, which is quantized by the quantizer, into a one-dimensional vector, and then performs the encoding process based on the variable-length coding method, wherein the arithmetic coding processor includes a binarizer, a binary arithmetic coding section, and a context calculator, wherein the binarizer generates a binary signal from a multivalued input signal, and the generated binary signal is encoded into an encoded bit stream by the binary arithmetic coding section, wherein the context calculator dynamically calculates and updates an event probability model for the binary signal in accordance with the condition of a neighboring symbol, the event probability model being an encoding target symbol, and wherein the binary arithmetic coding section encodes the binary signal into an encoded bit stream in accordance with the event probability model calculated and updated by the context calculator.

5. The video encoder according to claim 4, wherein the intermediate buffer is disposed in the arithmetic coding processor and coupled between the binarizer and the binary arithmetic coding section.

6. The video encoder according to claim 5, wherein an actual code amount of the binary arithmetic coding section in the arithmetic coding processor is supplied to the second input terminal of the code amount selector.

7. A video encoder comprising:

a frequency converter;

a quantizer;

an encoding section;

an intermediate buffer;

a code amount estimation section;

a code amount selector;

a rate controller;

a first counter;

a second counter; and a selector controller, wherein the frequency converter performs a frequency conversion process on an input signal, wherein the quantizer performs a quantization process on the result of the frequency conversion process performed by the frequency converter, wherein the encoding section generates a compressed video bit stream by performing an encoding process on the result of the quantization process performed by the quantizer, wherein the intermediate buffer is coupled between the output terminal of the quantizer and the input terminal of the encoding section, wherein the input terminal of the code amount estimation section is coupled to the output terminal of the quantizer, wherein an estimated code amount generated from the output terminal of the code amount estimation section is supplied to the first input terminal of the code amount selector, wherein an actual code amount of the compressed video bit stream encoded by the encoding section is supplied to the second input terminal of the code amount selector, wherein a determination signal indicative of whether the amount of data stored in the intermediate buffer is large or small is supplied to a selection control terminal of the code amount selector, wherein the output terminal of the code amount selector is coupled to the input terminal of the rate controller, wherein an output signal of the rate controller is used to adjust a quantization scale of the quantizer, wherein the first counter retains a first count value by counting the number of an image block, which is a coding process unit and quantized by the quantizer, wherein the second counter retains a second count value by counting the number of an image block, which is a coding process unit and encoded by the encoding section, wherein the selector controller determines the difference between the first count value of the first counter and the second count value of the second counter, wherein, if the difference between the first count value of the first counter and the second count value of the second counter is great, the selector controller determines that a delay of a process performed by the encoding section or the amount of data stored in the intermediate buffer is large, and wherein, if the difference between the first count value of the first counter and the second count value of the second counter is small, the selector controller determines that a delay of a process performed by the encoding section or the amount of data stored in the intermediate buffer is small, wherein, if the determination signal indicates that the amount of data stored in the intermediate buffer is large, the estimated code amount from the code amount estimation section, which is supplied to the first input terminal of the code amount selector, is output to the output terminal of the code amount selector, and the estimated code amount is used to adjust the quantization scale of the quantizer, and wherein, if the determination signal indicates that the amount of data stored in the intermediate buffer is small, the actual code amount from the encoding section, which is supplied to the second input terminal of the code amount selector, is output to the output terminal of the code amount selector, and the actual code amount is used to adjust the quantization scale of the quantizer.

8. The video encoder according to claim 7,
wherein the image block that is the coding process unit and quantized by the quantizer and the image block that is the coding process unit and encoded by the encoding section are a macroblock having a pixel size of 16×16 in terms of a luminance component.

9. The video encoder according to claim 7,
wherein the image block that is the coding process unit and quantized by the quantizer and the image block that is the coding process unit and encoded by the encoding section are a coding unit having a flexible block structure, and
wherein the coding unit is adaptively divisible from a largest coding unit (LCU) having a pixel size of 64×64.

10. The video encoder according to claim 1, further comprising:
a motion vector detector, a motion compensator, a subtractor, an inverse quantizer, an inverse frequency converter, a memory, an intra-prediction section, and a prediction selector,
wherein the motion vector detector generates a motion vector from a video signal to be encoded and from a reference image stored in the memory,
wherein the motion compensator generates a motion-compensated prediction signal in response to the motion vector generated from the motion vector detector and to the reference signal stored in the memory,
wherein the video signal is supplied to one input terminal of the subtractor, the motion-compensated prediction signal generated from the motion compensator is supplied to the other input terminal of the subtractor, and a predictive residual is generated from the output terminal of the subtractor,
wherein the predictive residual generated from the output terminal of the subtractor is supplied to the input terminal of the frequency converter as the input signal for the frequency conversion process,
wherein the inverse quantizer and the inverse frequency converter perform a local decoding process on the result of the quantization process performed by the quantizer, and the result of the local decoding process is stored in the memory as the reference image, wherein the result of the local decoding process performed by the inverse quantizer and the inverse frequency converter is stored in the memory as an intra-reference image,
wherein the video signal is supplied to one input terminal of the intra-prediction section, and the intra-reference image stored in the memory is supplied to the other input terminal of the intra-prediction section so that the intra-prediction section generates an intra-prediction signal about the video signal supplied to the one input terminal, and
wherein the prediction selector selects either one of the motion-compensated prediction signal generated from the motion compensator and the intra-prediction signal generated from the intra-prediction section and supplies the selected prediction signal to the other input terminal of the subtractor.

11. The video encoder according to claim 10,
wherein the frequency converter, the quantizer, the encoding section, the intermediate buffer, the code amount estimation section, the code amount selector, and the rate controller are integrated into a single semiconductor chip in a semiconductor integrated circuit.

12. The video encoder according to claim 11,
wherein the motion vector detector, the motion compensator, the subtractor, the inverse quantizer, the inverse frequency converter, the encoding section, the intra-prediction section, and the prediction selector are further integrated into the single semiconductor chip in the semiconductor integrated circuit.

13. The video encoder according to claim 1,
wherein the compressed video bit stream is generated by encoding the video signal in compliance with the H.264 standard or the H.265 standard, whichever is arbitrarily selected.

14. A method of operating a video encoder having a frequency converter, a quantizer, an encoding section, an intermediate buffer, a code amount estimation section, a code amount selector, and a rate controller, the method comprising the steps of:
causing the frequency converter to perform a frequency conversion process on an input signal;
causing the quantizer to perform a quantization process on the result of the frequency conversion process performed by the frequency converter;
causing the encoding section to generate a compressed video bit stream by allowing the encoding section to perform an encoding process on the result of the quantization process performed by the quantizer;
coupling the intermediate buffer between the output terminal of the quantizer and the input terminal of the encoding section;
coupling the input terminal of the code amount estimation section to the output terminal of the quantizer;
causing an estimated code amount, which is generated from the output terminal of the code amount estimation section, to be supplied to a first input terminal of the code amount selector;
causing an actual code amount of the compressed video bit stream, which is encoded by the encoding section, to be supplied to a second input terminal of the code amount selector;
causing a determination signal indicative of whether the amount of data stored in the intermediate buffer is large or small to be supplied to a selection control terminal of the code amount selector;

coupling the output terminal of the code amount selector to the input terminal of the rate controller, an output signal of the rate controller being used to adjust a quantization scale of the quantizer;

if the determination signal indicates that the amount of data stored in the intermediate buffer is large, causing the estimated code amount from the code amount estimation section, which is supplied to the first input terminal of the code amount selector, to be output to the output terminal of the code amount selector, the estimated code amount then being used to adjust the quantization scale of the quantizer; and if the determination signal indicates that the amount of data stored in the intermediate buffer is small, causing the actual code amount from the encoding section, which is supplied to the second input terminal of the code amount selector, to be output to the output terminal of the code amount selector, the actual code amount then being used to adjust the quantization scale of the quantizer, wherein whether the amount of data stored in the intermediate buffer is large or small is determined by checking whether the amount of stored data is larger than a predetermined threshold or by checking whether the amount of stored data is smaller than the predetermined threshold.

15. The method according to claim 14,
wherein the encoding section performs an encoding process based on either one of an arithmetic coding method and a variable-length coding method.

16. The method according to claim 15,
wherein, when the encoding section performs an encoding process based on the arithmetic coding method, the intermediate buffer absorbs the processing speed difference between the quantization process of the quantizer and the encoding process of the encoding section, which is based on the arithmetic coding method, and
wherein, when the encoding section performs an encoding process based on the variable-length coding method, the intermediate buffer absorbs the processing speed difference between the quantization process of the quantizer and the encoding process of the encoding section, which is based on the variable-length coding method.

17. The method according to claim 15,
wherein the encoding section includes an exponential-Golomb coding section, a variable-length coding processor, and an arithmetic coding processor,
wherein the exponential-Golomb coding section generates an exponential-Golomb code by encoding a syntax element to be encoded, the exponential-Golomb code including a prefix, a separator, and a suffix,
wherein the variable-length coding processor performs a zigzag scan to convert the result of the frequency conversion process performed by the frequency converter, which is quantized by the quantizer, into a one-dimensional vector, and then performs the encoding process based on the variable-length coding method,
wherein the arithmetic coding processor includes a binarizer, a binary arithmetic coding section, and a context calculator,
wherein the binarizer generates a binary signal from a multivalued input signal, the generated binary signal being encoded into an encoded bit stream by the binary arithmetic coding section,
wherein the context calculator dynamically calculates and updates an event probability model for the binary signal in accordance with the condition of a neighboring symbol, the event probability model being an encoding target symbol, and
wherein the binary arithmetic coding section encodes the binary signal into an encoded bit stream in accordance with the event probability model calculated and updated by the context calculator.

18. The method according to claim 17,
wherein the intermediate buffer is disposed in the arithmetic coding processor and coupled between the binarizer and the binary arithmetic coding section.

19. The video encoder according to claim 1,
wherein whether the amount of data stored in the intermediate buffer is large or small is determined by checking whether the amount of stored data is larger than a predetermined threshold or by checking whether the amount of stored data is smaller than the predetermined threshold.

* * * * *